United States Patent
Misikir et al.

(10) Patent No.: US 8,262,131 B2
(45) Date of Patent: Sep. 11, 2012

(54) AUTOMOTIVE KNEE BOLSTER SYSTEM

(75) Inventors: Laike Misikir, Ann Arbor, MI (US); Wanjun Lei, Troy, MI (US); Ami Nicole Kapadia, Canton, MI (US)

(73) Assignee: Ford Global Technologies, LLC, Dearborn, MI (US)

( * ) Notice: Subject to any disclaimer, the term of this patent is extended or adjusted under 35 U.S.C. 154(b) by 399 days.

(21) Appl. No.: 12/506,467

(22) Filed: Jul. 21, 2009

(65) Prior Publication Data
US 2011/0018247 A1    Jan. 27, 2011

(51) Int. Cl.
*B60R 21/02* (2006.01)
*B60R 21/04* (2006.01)
*B60R 21/045* (2006.01)

(52) U.S. Cl. ... 280/748; 280/751; 280/752; 296/187.05; 188/377

(58) Field of Classification Search ............ 280/748, 280/751, 752; 296/187.05, 193.02, 39.1; 188/371, 377; B60R 21/02, 21/04, 21/045
See application file for complete search history.

(56) References Cited

U.S. PATENT DOCUMENTS

| | | | | |
|---|---|---|---|---|
| 3,715,130 A * | 2/1973 | Harada et al. | | 280/738 |
| 4,844,213 A * | 7/1989 | Travis | | 188/377 |
| 5,201,544 A * | 4/1993 | Matano et al. | | 280/751 |
| 5,518,270 A * | 5/1996 | Hanada et al. | | 280/751 |
| 5,865,468 A * | 2/1999 | Hur | | 280/752 |
| 5,951,045 A * | 9/1999 | Almefelt et al. | | 280/748 |
| 6,086,098 A * | 7/2000 | Reiter et al. | | 280/752 |
| 6,095,593 A * | 8/2000 | Johann et al. | | 296/187.05 |
| 6,247,745 B1 * | 6/2001 | Carroll et al. | | 188/371 |
| 6,679,540 B1 * | 1/2004 | Graber et al. | | 296/146.6 |
| 6,702,324 B2 * | 3/2004 | Shimoyamada et al. | | 280/752 |
| 6,837,518 B2 * | 1/2005 | Mullan | | 280/752 |
| 6,866,294 B2 | 3/2005 | Horsch et al. | | |
| 7,128,339 B2 | 10/2006 | Mani | | |
| 7,210,704 B2 * | 5/2007 | Ko | | 280/748 |
| 7,222,896 B2 * | 5/2007 | Evans | | 293/120 |
| 7,261,318 B2 * | 8/2007 | Enders | | 280/732 |
| 7,338,075 B2 * | 3/2008 | Ellison et al. | | 280/752 |
| 7,357,415 B2 * | 4/2008 | Enders et al. | | 280/753 |
| 7,513,344 B2 * | 4/2009 | Toccalino et al. | | 188/371 |
| 7,735,866 B2 * | 6/2010 | Clashman et al. | | 280/752 |
| 7,802,839 B2 * | 9/2010 | Ajisaka | | 296/187.09 |
| 7,810,602 B2 * | 10/2010 | Evans | | 180/274 |
| 7,874,587 B2 * | 1/2011 | Miki et al. | | 280/752 |
| 7,879,424 B2 * | 2/2011 | Smith et al. | | 428/71 |
| 7,891,726 B2 * | 2/2011 | Gavrilov | | 296/187.05 |
| 2003/0184070 A1 * | 10/2003 | Vidal et al. | | 280/752 |
| 2005/0052011 A1 * | 3/2005 | Best et al. | | 280/752 |
| 2005/0062276 A1 * | 3/2005 | Nagata et al. | | 280/752 |
| 2005/0274584 A1 | 12/2005 | Baxter | | |
| 2006/0113781 A1 * | 6/2006 | Dancasius et al. | | 280/752 |
| 2008/0093831 A1 * | 4/2008 | Ellison | | 280/752 |
| 2011/0018247 A1 * | 1/2011 | Misikir et al. | | 280/751 |

FOREIGN PATENT DOCUMENTS

| | | | |
|---|---|---|---|
| JP | 09-06678 | * | 3/1997 |
| JP | 2006044377 A | | 2/2006 |
| JP | 2007-284034 | * | 11/2007 |

* cited by examiner

*Primary Examiner* — Joseph Rocca
*Assistant Examiner* — Karen A Beck
(74) *Attorney, Agent, or Firm* — Greg P. Brown; Brooks Kushman P.C.

(57) ABSTRACT

An automotive knee bolster system includes a cross-car beam, and a variable stiffness member attached to the cross-car beam and configured to absorb occupant knee impact energy. The member includes a plurality of nested panels each having a different length and substantially the same radius of curvature.

18 Claims, 4 Drawing Sheets

AUTOMOTIVE KNEE BOLSTER SYSTEM

BACKGROUND

U.S. Pat. No. 6,866,294 to Horsch et al. provides a knee support arranged inside a body of a motor vehicle, and exhibits a transverse frame member which (i) extends at right angles to the longitudinal direction of the motor vehicle, (ii) is held at rigid, lateral body structures, and (iii) is provided with at least one deformation element. This deformation element comprises several hollow brackets defined by bracket walls, and is covered by a support wall facing an occupants' knees. The deformation element exhibits a first hollow bracket segment, which runs along the support wall, and a second additional hollow bracket segment, which is arranged at an angle to the first hollow bracket segment. The second hollow bracket segment is attached to the transverse frame member.

U.S. Pat. No. 6,702,324 to Shimoyamada et al. provides a knee bolster for absorbing the impact to knees of a vehicle occupant, and controlling the posture of the occupant by receiving the knee load. The knee bolster includes a pair of left and right panels disposed to oppose the knees, upper and lower stays provided to each of the panels, and a connecting member for connecting the resulting pair of deltoid bodies. Each upper stay has its rear portion fixed to the upper area of the corresponding panel. Each lower stay has its lower portion fixed to the lower area of the corresponding panel, and its upper portion fixed to the front end of the corresponding upper stay. The bodies are disposed side by side and spaced apart when connected to the connecting member. Preferably, the upper and lower stays are arced, and the curvature radius of the lower stays is less than that of the upper stays.

United States Patent Application Publication Number 2006/0113781 to Dancasius et al. provides a motor vehicle knee support element for absorbing energy in a knee region. The knee support element includes a first deformation element for absorbing energy upon impact of the knees in a first impact zone, and a second deformation element for absorbing energy upon impact of the knees in a second impact zone. The first deformation element is linked to the second deformation element in order to deform the second deformation element, and thereby limit the resistance of the second deformation element against deformation upon impact on the first impact zone.

SUMMARY

An automotive knee bolster system includes a cross-car beam, and a variable stiffness member attached to the cross-car beam and configured to absorb occupant knee impact energy. The member includes a plurality of nested panels each having a different length and substantially the same radius of curvature.

An automotive knee bolster system includes a cross-car beam, and a pair of energy absorbing members attached to the cross-car beam. Each of the members includes a plurality of panels stacked within each other, having the same shape, and having differing lengths.

An automotive knee bolster system includes a cross-car beam, a pair of members attached to the cross-car beam and configured to absorb occupant knee impact energy, and a bolster cover to conceal the pair of members. Each of the members includes at least two nested panels mechanically fixed together and having the same radius of curvature, different lengths, and the same thickness.

While example embodiments in accordance with the invention are illustrated and disclosed, such disclosure should not be construed to limit the invention. It is anticipated that various modifications and alternative designs may be made without departing from the scope of the invention.

DETAILED DESCRIPTION

Figure 1:
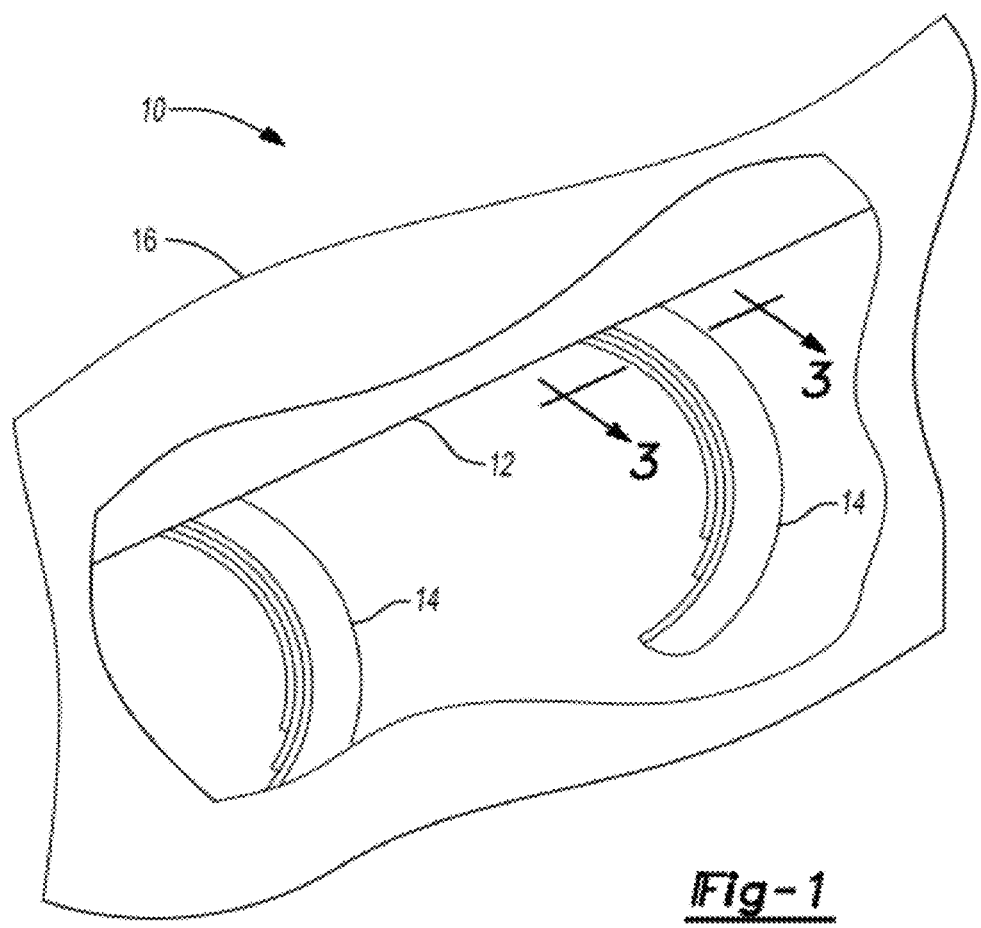
FIG. 1 is an embodiment of a knee bolster system.

Referring now to FIG. 1, an embodiment of an automotive knee bolster system 10 may include a cross-car beam 12, one or more energy absorbing members 14 attached, e.g., welded, bonded, etc., with the cross-car beam 12, and a bolster cover 16. As apparent to those of ordinary skill, the members 14 and cover 16 are located within a vicinity of a vehicle occupant's knees. As discussed below, the members 14 are configured to absorb and/or transfer energy associated with impact loads generated by the occupant's knees.

Figure 2:
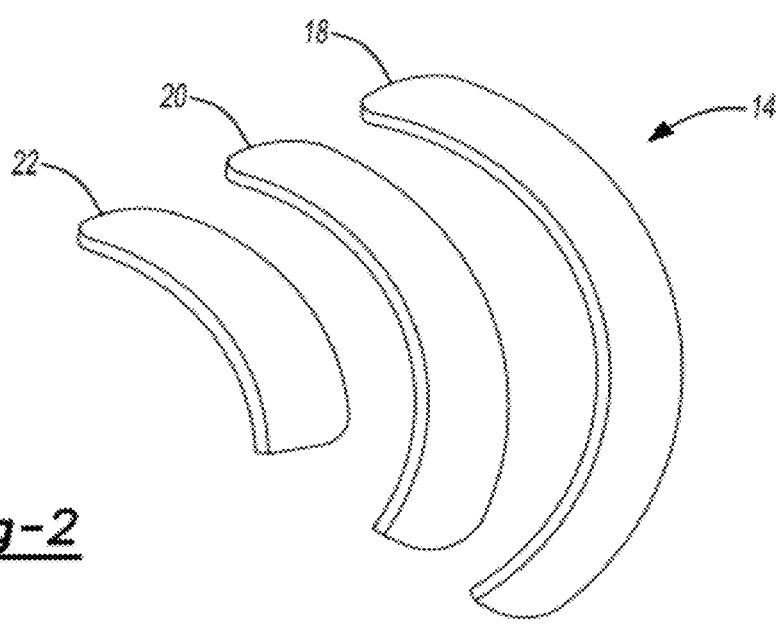
FIG. 2 is an exploded assembly view of an energy absorbing member of FIG. 1.

Referring now to FIG. 2, the member 14 includes arcuate panels 18, 20, 22 of differing lengths that have generally the same width, thickness and radius of curvature. As such, the panels 18, 20, 22 may be, for example, cut from the same roll-formed steel blank. The panels 18, 20, 22 are nested (or stacked within) one another. In other embodiments, any number of suitably shaped panels (U-shaped, J-shaped, C-shaped, etc.) may be used. These panels may be of the same or differing lengths, and have generally the same or differing widths and/or thicknesses.

In the embodiment of FIG. 2, the panels 18, 20, 22 may be welded together. In other embodiments, the panels 18, 20, 22 may be bolted or otherwise fixed together.

As apparent to those of ordinary skill, the stiffness (and thickness) of the member 14 varies along its length because it is comprised of the panels 18, 20, 22 of differing lengths. For example, the member 14 is least stiff towards the bottom (as illustrated) because the member 14 comprises only a single panel at that location. The member 14 is most stiff towards the top (as illustrated) because the member 14 comprises several panels at that location. This varying stiffness may accommodate differing performance objectives with regard to occupants of various sizes. For example, the knees of a small occupant may likely impinge upon the member 14 towards its bottom. The knees of a large occupant may likely impinge upon the member 14 towards its top. The member 14 may be able to bend or flex more for the small occupant as compared with the large occupant, as the member 14 is less stiff towards its bottom relative to its top.

Figures 3, 4:
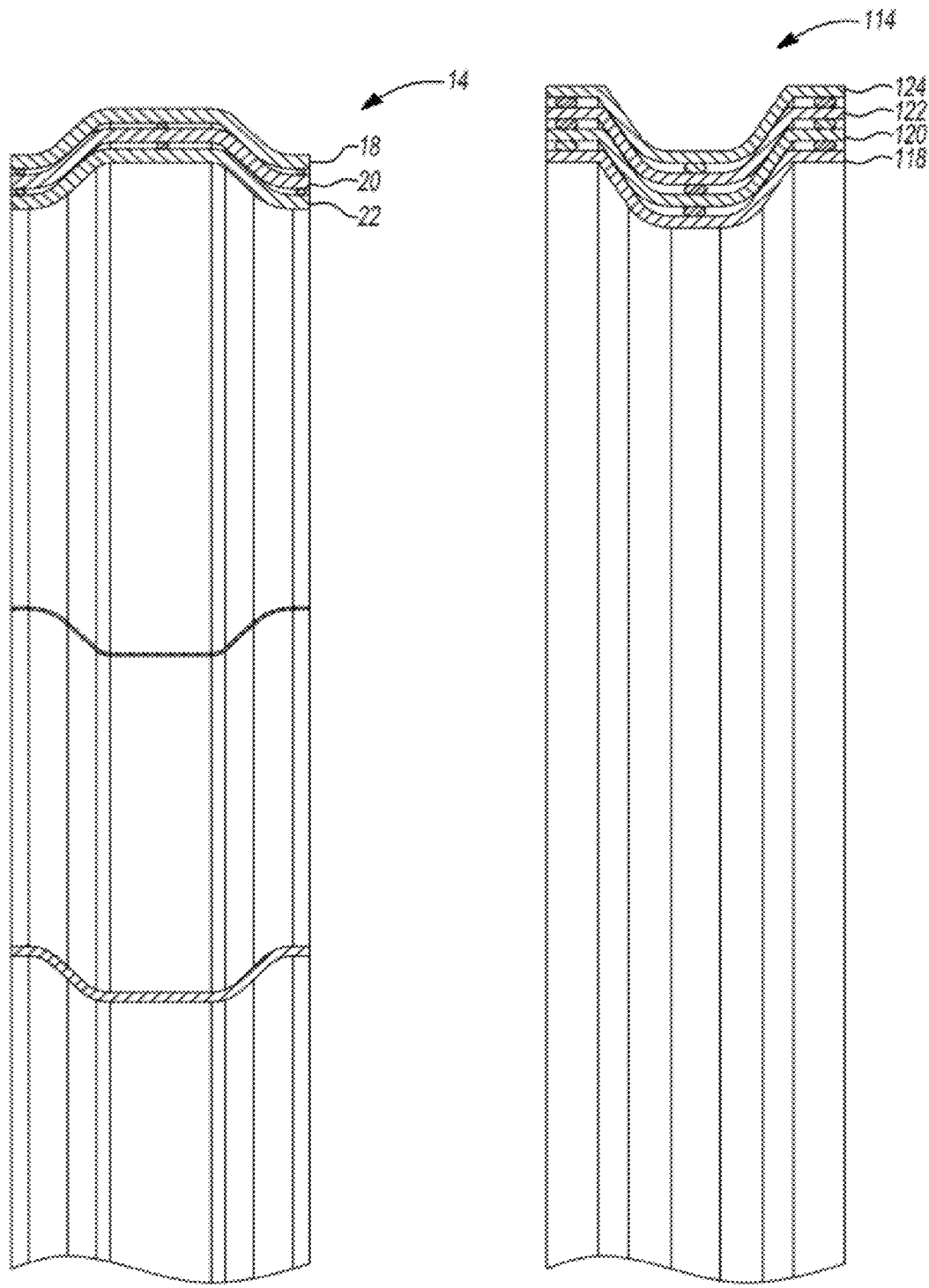
FIG. 3 is a rear view, in cross-section, of the energy absorbing member of FIG. 1 taken along line 3-3 of FIG. 1.
FIG. 4 is a rear view, in cross-section, of another embodiment of an energy absorbing member.

Referring now to FIG. 3, the panels 18, 20, 22 of the member 14 are generally concave in cross-section and, in this example, spot welded together (as indicated by oval) at the generally flat portions of the cross-section. As assembled, the panel 20 is disposed between the panels 18, 22 such that the panel 18 is closest to the occupant, and the panel 22 is furthest from the occupant. In other embodiments, the panel 18 may be disposed between the panels 20, 22 such that either of the panels 20, 22 are closest to/furthest from the occupant. Other arrangements are also possible.

Referring now to FIG. 4, the numbered elements of FIG. 4 that differ by 100 relative to the numbered elements of FIG. 3 have similar descriptions to the numbered elements of FIG. 3. Panels 118, 120, 122, 124 of member 114 are generally convex in cross-section. As assembled, the panels 120, 122 are disposed between the panels 118, 124 such that the panel 124 is closest to the occupant, and the panel 118 is furthest from the occupant. Other arrangements, cross-sectional shapes, and assembled orderings of the panels 118, 120, 122, 124 are, of course, also possible.

Figure 5:
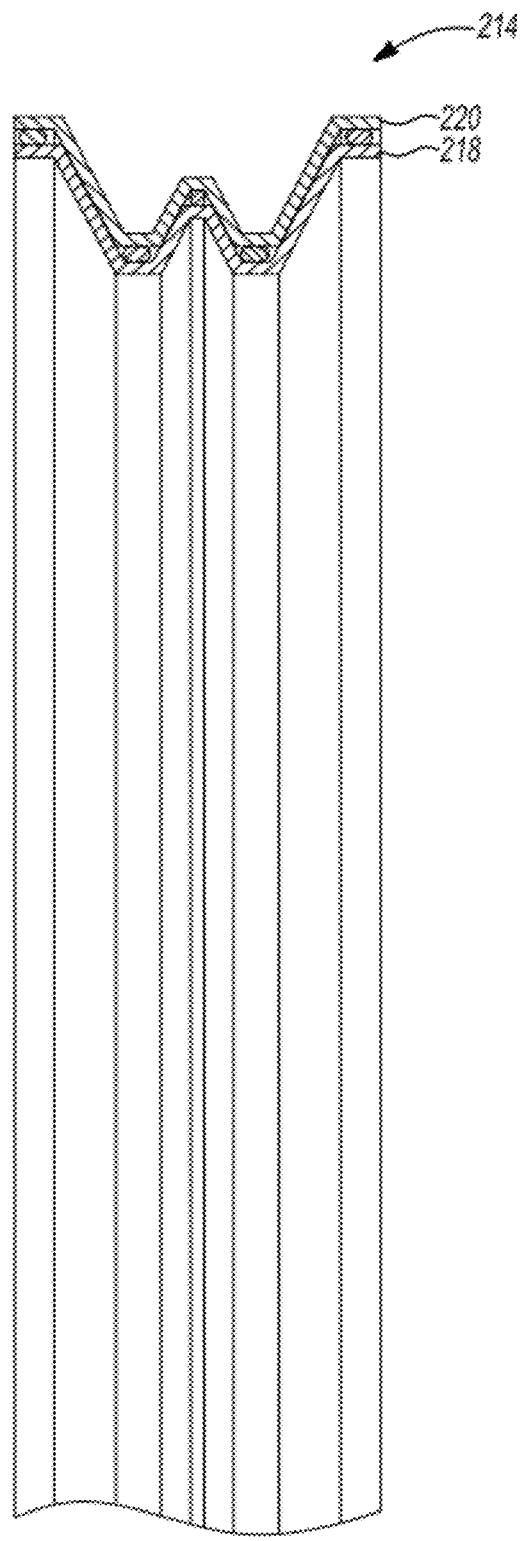
FIG. 5 is a rear view, in cross-section, of yet another embodiment of an energy absorbing member.

Referring now to FIG. 5, the numbered elements of FIG. 5 that differ by 200 relative to the numbered elements of FIG. 3 have similar descriptions to the numbered elements of FIG. 3. Panels 218, 220 of member 214 are generally W-shaped in cross-section. The panel 218 is the longest and is disposed furthest from the occupant.

Figure 6:
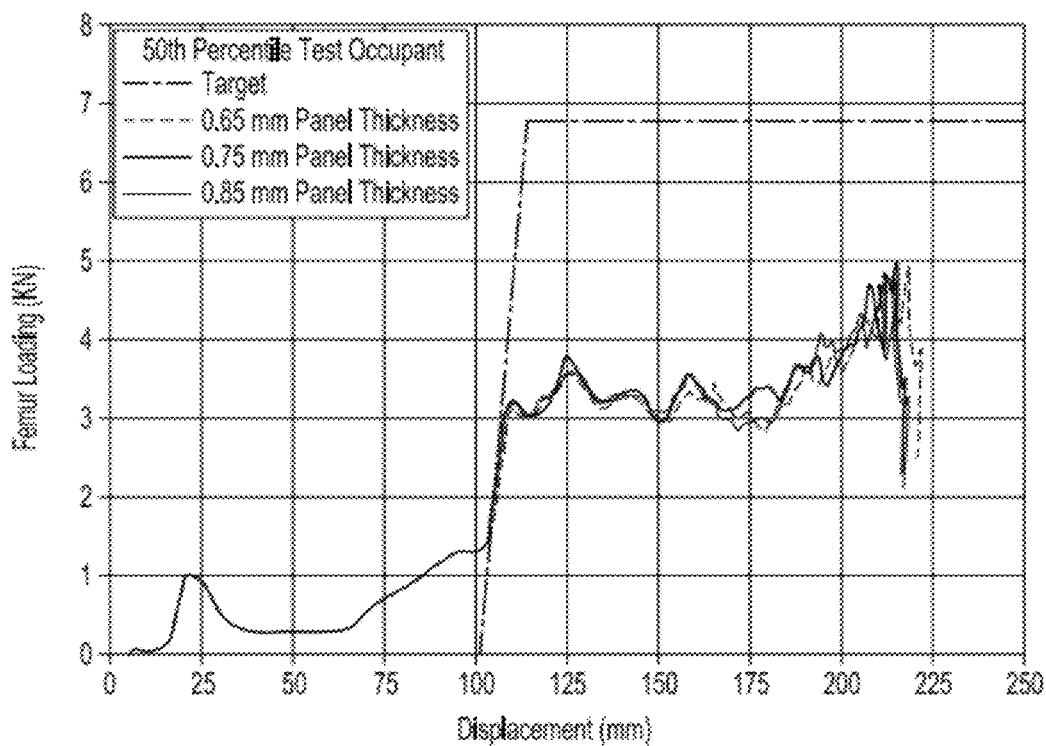
FIG. 6 is an example plot of outboard femur loading versus displacement for a $50^{th}$ percentile test occupant.
Figure 7:
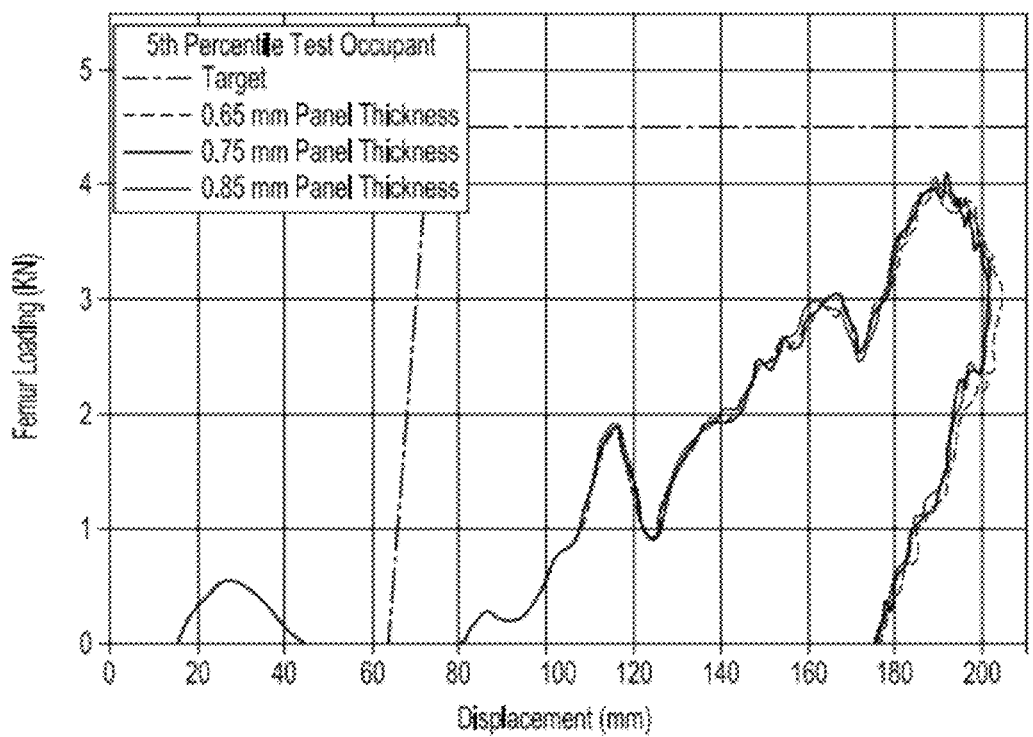
FIG. 7 is an example plot of outboard femur loading versus displacement for a $5^{th}$ percentile test occupant.

Referring now to FIGS. 6 and 7, outboard energy absorbing members similar in shape to those discussed with reference to FIG. 4 were tested, in standard fashion, to evaluate femur loading versus displacement for $50^{th}$ and $5^{th}$ percentile test occupants. In these tests, the members each included 3 panels formed from cold-rolled, mild steel, and spot welded together. The members were assembled from panels having one of three thicknesses: 0.65 mm, 0.75 mm, 0.85 mm.

FIG. 6 reveals that for displacements above approximately 100 mm with respect to the $50^{th}$ percentile test occupant, the outboard femur loads remained below their target values. FIG. 7 reveals that for displacements above approximately 60 mm with respect to the $5^{th}$ percentile test occupant, the outboard femur loads remained below their target values.

While embodiments of the invention have been illustrated and described, it is not intended that these embodiments illustrate and describe all possible forms of the invention. The words used in the specification are words of description rather than limitation, and it is understood that various changes may be made without departing from the spirit and scope of the invention.

What is claimed:

1. An automotive knee bolster system comprising:
   a cross-car beam; and
   a variable stiffness member attached to the cross-car beam and configured to absorb occupant knee impact energy, the member including a plurality of nested panels each having a different length and substantially the same shape along the entire length of each of the panels.

2. The system of claim 1 wherein the panels have the same thickness.

3. The system of claim 1 wherein a stiffness of the member increases as a thickness of the member increases.

4. The system of claim 1 wherein the panels are generally convex in cross-section.

5. The system of claim 1 wherein the panels are generally concave in cross-section.

6. The system of claim 1 wherein the panels are generally W-shaped in cross-section.

7. The system of claim 1 wherein the panels are mechanically fixed together.

8. An automotive knee bolster system comprising:
   a cross-car beam; and
   a pair of energy absorbing members attached to the cross-car beam, each of the members including a plurality of panels (i) stacked within each other, (ii) having differing lengths, and (iii) having the same shape along the entire length of each of the panels.

9. The system of claim 8 wherein the panels each have the same thickness.

10. The system of claim 8 wherein a stiffness of each of the members increases as a thickness of each of the members increases.

11. The system of claim 8 wherein each of the panels is generally convex in cross-section.

12. The system of claim 8 wherein each of the panels is generally concave in cross-section.

13. The system of claim 8 wherein each of the panels is generally W-shaped in cross-section.

14. An automotive knee bolster system comprising:
   a cross-car beam;
   a pair of members attached to the cross-car beam and configured to absorb occupant knee impact energy, each of the members including at least two nested panels mechanically fixed together and having (i) different lengths, (ii) the same shape along the entire length of each of the panels and (iii) the same thickness; and
   a bolster cover to conceal the pair of members.

15. The system of claim 14 wherein a stiffness of each of the members depends on a respective thickness of each of the members.

16. The system of claim 14 wherein each of the panels is generally convex in cross-section.

17. The system of claim 14 wherein each of the panels is generally concave in cross-section.

18. The system of claim 14 wherein each of the panels is generally W-shaped in cross-section.

* * * * *